(12) United States Patent
Kipp et al.

(10) Patent No.: US 11,375,017 B2
(45) Date of Patent: Jun. 28, 2022

(54) METHODS AND SYSTEMS FOR PROCESSING DATA REQUESTS

(71) Applicant: Comcast Cable Communications, LLC, Philadelphia, PA (US)

(72) Inventors: Neill A. Kipp, Centennial, CO (US); Jan R. van Doorn, Castle Rock, CO (US); Richard J. Fliam, Greenwood Village, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 17/318,807

(22) Filed: May 12, 2021

(65) Prior Publication Data

US 2022/0103630 A1 Mar. 31, 2022

Related U.S. Application Data

(63) Continuation of application No. 16/455,387, filed on Jun. 27, 2019, now Pat. No. 11,038,962, which is a continuation of application No. 15/290,766, filed on Oct. 11, 2016, now Pat. No. 10,382,550, which is a continuation of application No. 14/169,930, filed on Jan. 31, 2014, now Pat. No. 9,491,239.

(51) Int. Cl.
| | |
|---|---|
| *H04L 67/1097* | (2022.01) |
| *G06F 12/0813* | (2016.01) |
| *G06F 3/06* | (2006.01) |
| *H04L 67/564* | (2022.01) |
| *H04L 67/568* | (2022.01) |
| *H04L 67/56* | (2022.01) |

(52) U.S. Cl.
CPC ........ *H04L 67/1097* (2013.01); *G06F 3/0604* (2013.01); *G06F 3/067* (2013.01); *G06F 3/0655* (2013.01); *G06F 12/0813* (2013.01); *H04L 67/28* (2013.01); *H04L 67/2819* (2013.01); *H04L 67/2842* (2013.01); *G06F 3/06* (2013.01); *G06F 2003/0697* (2013.01)

(58) Field of Classification Search
CPC . H04L 67/1097; H04L 67/28; H04L 67/2819; H04L 67/2842; G06F 3/0604; G06F 3/0655; G06F 3/067; G06F 12/0813; G06F 2003/0697
See application file for complete search history.

(56) References Cited

U.S. PATENT DOCUMENTS

| | | |
|---|---|---|
| 5,907,678 A | 5/1999 | Housel, III et al. |
| 6,061,714 A | 5/2000 | Housel, III et al. |
| 6,185,617 B1 | 2/2001 | Housel, III et al. |
| 6,289,358 B1 | 9/2001 | Mattis et al. |
| 6,425,057 B1 | 7/2002 | Cherkasova et al. |
| 9,491,239 B2 | 11/2016 | Kipp et al. |
| 2001/0003828 A1 | 6/2001 | Peterson et al. |
| 2003/0120793 A1 | 6/2003 | Marjola |
| 2003/0187935 A1 | 10/2003 | Agarwalla et al. |
| 2005/0005107 A1 | 1/2005 | Touboul |
| 2007/0094389 A1 | 4/2007 | Nussey et al. |
| 2009/0198790 A1 | 8/2009 | Grevers, Jr. |
| 2010/0332480 A1 | 12/2010 | Verreaux |
| 2013/0290733 A1 | 10/2013 | Branton et al. |
| 2013/0290734 A1 | 10/2013 | Branton et al. |
| 2014/0006538 A1 | 1/2014 | Oikonomou |
| 2015/0006662 A1 | 1/2015 | Braness |
| 2015/0222704 A1 | 8/2015 | Kipp et al. |
| 2015/0304444 A1 | 10/2015 | Lundborg |

*Primary Examiner* — Brian Whipple
(74) *Attorney, Agent, or Firm* — Ballard Spahr LLP

(57) ABSTRACT

Methods and systems for managing data and transmission of content are disclosed. A computing device may receive a request for content. The computing device may determine data associated with the requested content.

24 Claims, 7 Drawing Sheets

| Fragment Identifier | Resolution/bitrate profile | Locations | Cost Function |
|---|---|---|---|
| 1 | 720p60-5mbps | URL1a | C1a |
| 1 | 720p60-5mbps | URL1b | C1b |
| 2 | 720p30-3mbps | URL2 | C2 |

METHODS AND SYSTEMS FOR PROCESSING DATA REQUESTS

CROSS REFERENCE TO RELATED APPLICATION

This application is a Continuation of U.S. application Ser. No. 16/455,387, filed on Jun. 27, 2019, which is a Continuation of U.S. application Ser. No. 15/290,766 filed Oct. 11, 2016, and issued as U.S. Pat. No. 10,382,550, which is a Continuation of U.S. application Ser. No. 14/169,930 filed Jan. 31, 2014, and issued as U.S. Pat. No. 9,491,239, which are herein incorporated by reference in their entireties.

BACKGROUND

In an adaptive streaming media system, a computing device can process requests for one or more data assets such as a sequence of content fragments. The computing device can reference a fragment index to determine the span of data that constitutes the requested fragment. A user device (e.g., digital media player) can receive and assemble the requested fragments and can render the fragments to a user.

An example implementation of the computing device (e.g., fragment server) uses a spinning disk storage device to store the digital media and its associated fragment indexes. The fragment server can receive a fragment request, seek an index file, read the index file, seek the media file, read the requested fragment from the media file, and respond to the requestor (e.g., client) with the requested fragment data. As such, the naive implementation requires a minimum of two seeks per fragment.

As the number of requests to the computing device increases, the time it takes to seek on the disk becomes a performance bottleneck. One problem is that fragment servers can receive millions of fragment requests per second and the spinning disks cannot keep up. Replacing spinning disk storage with solid-state devices (SSD) may alleviate the seek time problem. But for the same storage, solid-state disks cost about ten times the cost of a spinning disk. Thus the cost of this solution is prohibitive. This disclosure addresses such and other shortcomings related to control of content delivery.

SUMMARY

It is to be understood that both the following summary and the following detailed description are exemplary and explanatory only and are not restrictive, as claimed. In some aspects, provided are methods and systems for controlling data such as content transmitted to one or more user devices. Provided are methods and systems for, in another aspect, dynamically managing data, such as content presented via one or more user devices. In an aspect, systems and methods can relate to managing data based upon an index such as a manifest file. The index can comprise identifiers associated with one or more content assets such as videos, fragments, data blocks, segments, and the like. In an aspect, the index can comprise information relating to the content assets such as location, bitrate, resolution, cost function and the like.

In another aspect, a computing device can cache one or more indexes relating to a data read for one or more content assets, while not caching actual data reads for the one or more content assets. Once a cache is fully populated with the relevant index data, the computing device can process requests for fragment data and minimize resources used in processing index requests. In a further aspect, selective caching can be implemented by toggling-on cache usage for index reads and toggling-off cache usage for the larger and less frequent fragment reads (e.g., content request). As an example, when the underlying implementation is based on a network file system (NFS), the toggling-off of caching of fragment reads can be executed by setting an O_DIRECT flag to true in the read system call. As another example, when implemented in a NoSQL system such as Redis or MongoDB, indexes can be cached in the NoSQL database. As a further example, when implemented in an Enterprise Java system, indexes can be cached in Ehcache.

In an aspect, the methods can comprise receiving a first request from a first computing device via a network. An index can be received from a first storage medium in response to the first request. The index can be stored in a second storage medium. The first storage medium can be located in the network upstream from the second storage medium relative to the first computing device. A second request can be received from one or more of the first computing device and a second computing device via the network. The index can be retrieved from the second storage medium in response to the second request.

In another aspect, the methods can comprise receiving a request for a data asset and determining if an index associated with the requested data asset is stored in a first medium, e.g., a cache. If the index is stored in the cache, the index can be retrieved from the cache. If the index is not stored in the cache, the index can be retrieved from a second storage medium such as a remote storage device. The retrieved index can then be in the cache for subsequent retrieval.

In a further aspect, the methods can comprise accessing and/or reading a cache comprising a plurality of indexes. The cache can be populated from one or more remote storage devices located external to the cache. An index can be provided to a requesting device. The requested index can facilitate a request for a data fragment.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
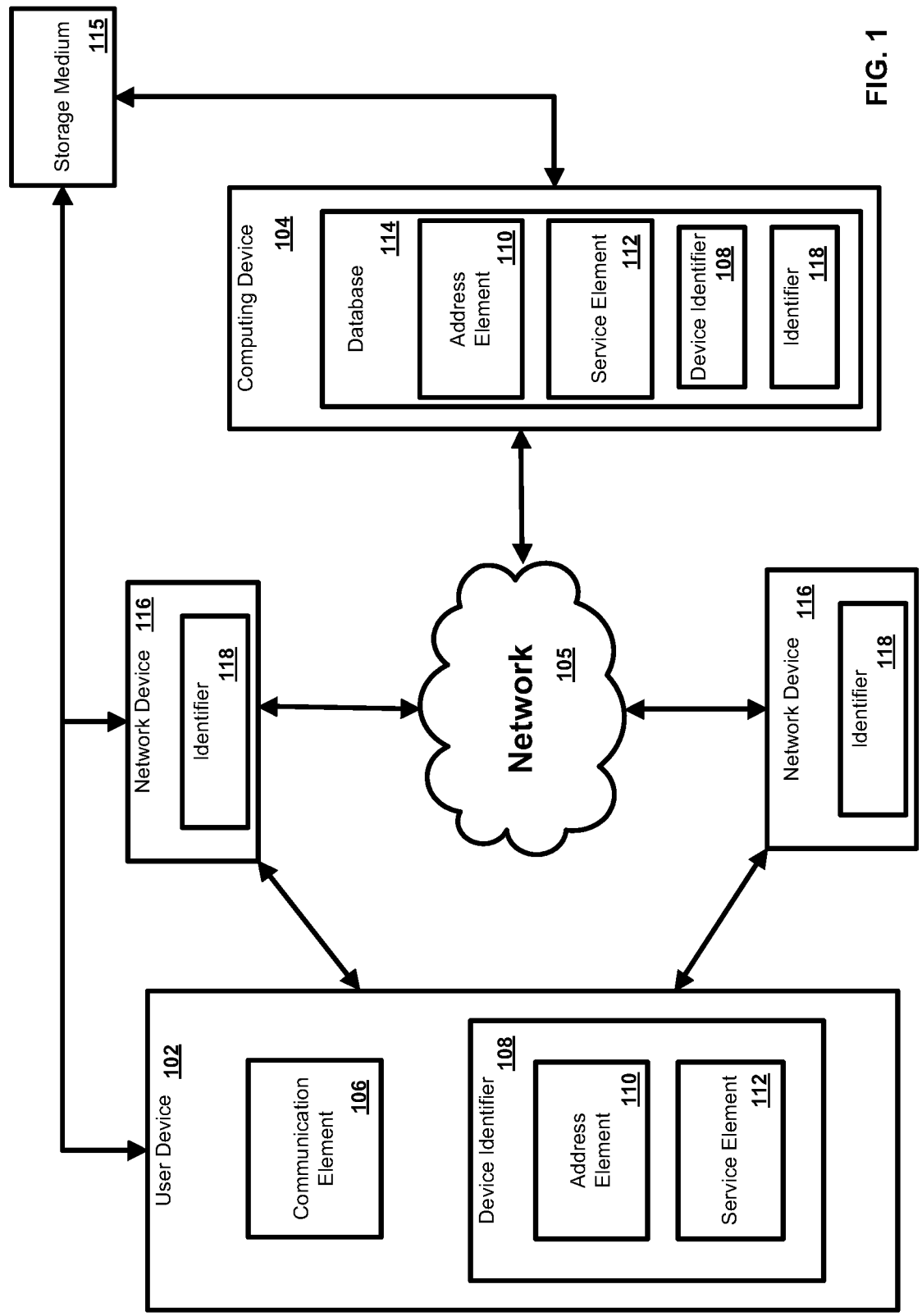
FIG. 1 is a block diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, a first computing device can be configured to store one or more content items (e.g., data fragments, content blocks, content assets, etc.). As an example, the first computing device can be configured to process received requests for one or more content items. As a further example, the first computing device can be configured to process requests for location information such as an index (e.g., manifest) of locations of one or more content items. In an aspect, systems and methods can relate to managing data based upon an index such as a manifest file. The index can comprise identifiers associated with one or more content assets such as videos, fragments, data blocks, and the like. In an aspect, the index can comprise information relating to the content assets such as location, bitrate, resolution, cost function, and the like. In another aspect, the index can comprise information relating to various quality level (e.g., bitrate and resolution) content fragments located at network storage, local device storage, or a combination thereof. When the location of one or more of the content items is changed, the index can be modified to reflect the updated location of the data segments. When an identifier, cost function, parameter, or other characteristic relating to one or more data segments is changed, the index can be automatically updated to reflect the change. In another aspect, a device, such as a user device, can receive the index and can dynamically request particular data to be received.

In another aspect, a second computing device can be configured to store (e.g., cache) one or more data reads (e.g., index requests) from indexes relating to one or more content items. As an example, when a request for location information is processed by the first computing device, the second computing device can cache the result of the request. As another example, the second computing device can be located downstream of the first computing device such as in closer network proximity to the requesting device (e.g., user device) than the first computing device. Network proximity can be a measure of physical distance, logical distance, available bandwidth, congestion, or a combination thereof. As a further example, the second computing device can be located upstream of a plurality of user device such as a group of devices and can service the plurality of device by caching one or more of the data reads proffered by the plurality of user devices.

In another aspect, the second computing device can cache one or more indexes, while not caching data reads from the one or more content assets. At a performance asymptote, the methods and systems can provide a cache of all the relevant indexes for one or more users and/or user devices in order to minimize the data reads transmitted to the first computing device. As an example, once a cache is fully populated (e.g., populated with a threshold amount) with the relevant index data, the first computing device of the one or more content items can process requests for fragment data and minimize resources used in processing index requests. In a further aspect, the second computing device that is configured to cache one or more data reads relating to indexes can also be configured to maintain the cache of indexes such that the cached indexes are not evicted or deleted unless they are updated. In a further aspect, selective caching can be implemented by toggling-on cache usage for index reads and toggling-off cache usage for the larger and less frequent fragment reads (e.g., content request). As an example, when the underlying implementation is based on a network file system (NFS), the toggling-off of caching of fragment reads can be executed by setting the O_DIRECT flag to true in the read system call. As another example, in a NoSQL implementation such as Redis or MongoDB, the results of fragment reads can be deliberately not copied to the NoSQL database. As a further example, in an Enterprise Java solution, the results of fragment reads can be deliberately not copied into Ehcache.

In one aspect of the disclosure, a system can be configured to provide services such as network-related data services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback such as a application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., indexes, content items, data fragments, location identifiers, relational tables, user device identifiers) (e.g., identifier 108) or records, network device identifiers (e.g., identifier 118), or other information. As a further example, the user device 102 can request and/or receive (e.g., retrieve) a file from the database 114 such as an index (e.g., manifest) of one or more location identifiers associated with one or more content items. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, computing device 104 can be configured to store one or more content items (e.g., data fragments, content blocks, content assets, etc.). As an example, the computing device 104 can be configured to process received requests for one or more content items. As a further example, the computing device 104 can be configured to process requests for location information such as an index (e.g., manifest) of locations of one or more content items. In an aspect, computing device 104 can be configured to manage data based upon an index such as a manifest file. The index can comprise identifiers associated with one or more content assets such as videos, fragments, data blocks, and the like. In an aspect, the index can comprise information relating to the content assets such as location, bitrate, resolution, cost function, and the like. In another aspect, the index can comprise information relating to various quality level (e.g., bitrate and resolution) content fragments located at network storage, local device storage, or a combination thereof. When the location of one or more of the content items is changed, the index can be modified to reflect the updated location of the data segments. When an identifier, cost function, parameter, or other characteristic relating to one or more data segments is changed, the index can be automatically updated to reflect the change.

In another aspect, a storage medium 115 can be configured to store (e.g., cache) one or more data reads (e.g., index requests) from indexes relating to one or more content items. As an example, when a request for location information is processed by the computing device 104, the storage medium 115 can cache the result of the request. As another example, the storage medium 115 can be located downstream of the computing device 104 such as in closer network proximity to the requesting device (e.g., user device). As a further example, the storage medium 115 can be located upstream of a plurality of user device such as a group of devices and can service the plurality of device by caching one or more of the data reads proffered by the plurality of user devices.

In another aspect, the storage medium 115 can cache one or more indexes, while not caching data reads from the one or more content assets. Once an in-memory cache is fully populated with the relevant index data, the computing device 104 can process requests for data and minimize resources used in processing indexes. In a further aspect, the storage medium 115 can also be configured to maintain the cache of indexes such that the cached indexes are not evicted or deleted unless they are updated. In a further aspect, selective caching can be implemented by toggling-on cache usage for index reads and toggling-off cache usage for the larger and less frequent fragment reads (e.g., content request). As an example, when the underlying implementation can be based on a network file system (NFS), networked attached storage (NAS), storage area network (SAN), and the like. As a further example, the toggling-off of caching of content (e.g., fragment) reads can be executed by setting the O_DIRECT flag to true in the read system call.

In an aspect, one or more network devices 116 can be in communication with a network such as network 105. As an example, one or more of the network devices 116 can facilitate the connection of a device, such as user device 102, to the network 105. As a further example, one or more of the network devices 116 can be configured as a network gateway. In an aspect, one or more network devices 116 can be configured to allow one or more wireless devices to connect to a wired and/or wireless network using Wi-Fi, Bluetooth or similar standard.

In an aspect, the network devices 116 can be configured as a mesh network. As an example, one or more network devices 116 can comprise a dual band wireless network device. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be a media access control address (MAC address). As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the user device 102 can provide information such as identification information (e.g., device identifier 108, credentials, etc.) to one or more network devices 116. As an example, the user device 102 can request service such connectivity to a network by providing information to the network device 116. In another aspect, the network device 116 can transmit the information received from the user device 102 to the computing device. As an example, the network device 116 can invoke a lookup algorithm to locate a record associated with the information provided by the user device 102. As a further example, the record can be located in service provider database (e.g., database 114). In a further aspect, the information provided by the user device 102 may be associated with an identifier of the network device 116. As an example, a database record can comprise a mapping of a device identifier (e.g., device identifier 108) and an identifier (e.g., identifier 118) associated with the network device 116.

Figure 2:
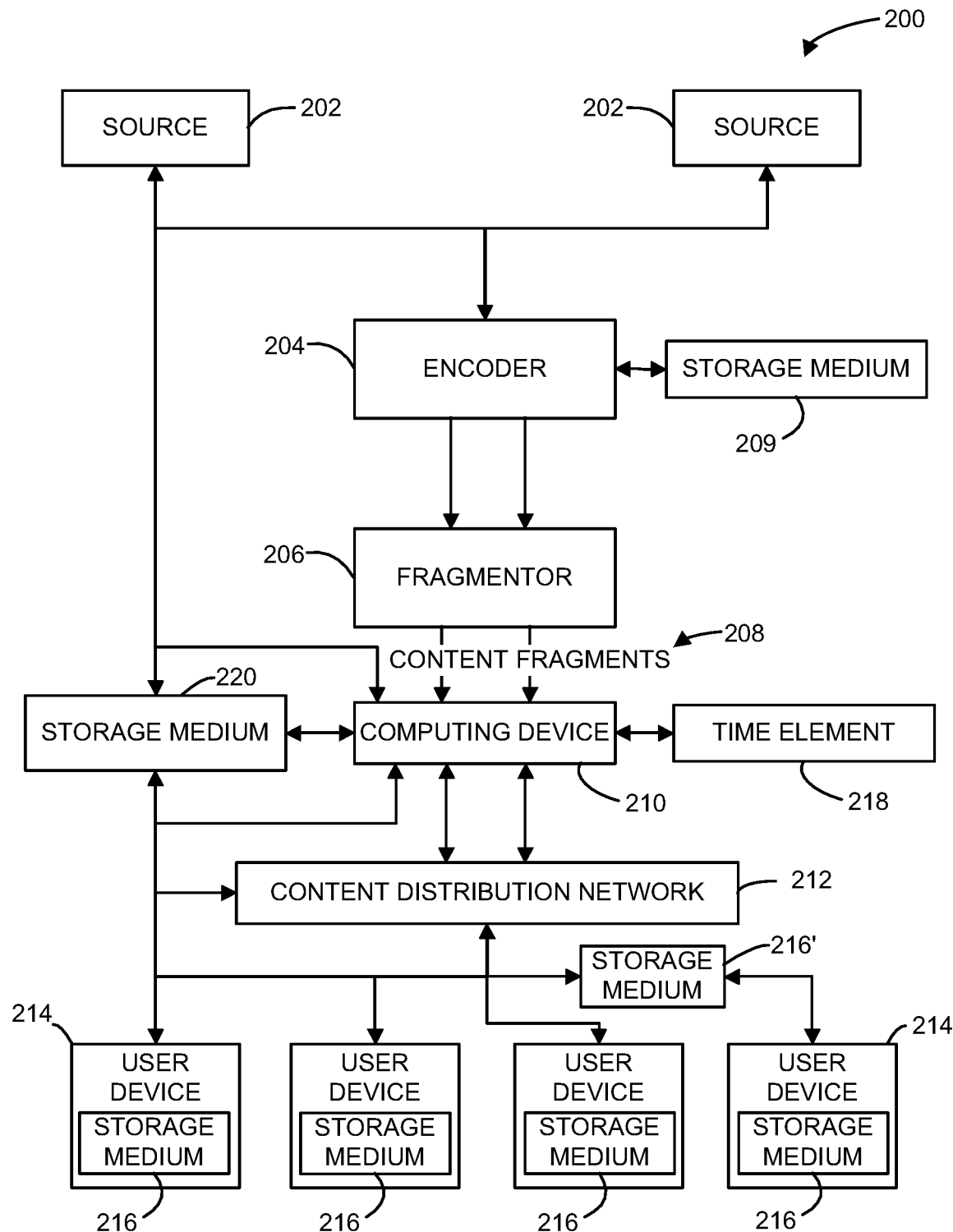
FIG. 2 is a block diagram of an example system architecture.

FIG. 2 is a block diagram of an example system 200. The system 200 can comprise one or more networks, and one or more data sources 202 for accessing and/or transmitting data, such as a data stream. An encoder 204 can be in signal communication with the data sources 202. A fragmentor 206 can be in signal communication with the encoder 204. As an example, the encoder 204 and the fragmentor 206 can be integrated as part of a unitary device. However, the encoder 204 and the fragmentor 206 can be separate and distinct components.

In an aspect, the data sources 202 can comprise a content provider for providing one or more of audio content, video content, data, news feeds, sports programming, advertisements, and the like. As an example, the data sources 202 can be configured to transmit the data (e.g., as a stream, fragments, files, etc.) to various end-users. In an aspect, one or more data sources 202 can comprise a content database having a plurality of advertisements, content assets, and the like stored therein or capable of accessing advertisement stored elsewhere. As an example, the advertisement database can comprise a plurality of video advertisements.

As an example, one or more of the data sources 202 can comprise a network data feed transmitting the data stream to users such as subscribers or clients. As a further example, the one or more data sources 202 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any other standard for audio and/or video, such as MP3, Quicktime, and Audio Video Interleave (avi). However, the encoder 204 can be configured to receive the data stream from any source having any format that can be encoded (or transcoded) into a format that is appropriate for streaming or otherwise transmitting.

The encoder 204 can be any device, system, apparatus, or the like to encode and/or transcode the data stream. In an aspect, the encoder 204 converts a single (high) bit rate and resolution to an output of multiple (lower) bitrates and resolutions. As an example, the encoder 204 can convert the data stream from the input format received from the data source (such as MPEG-2, QAM, etc.) to a transport format for distribution to consumers (such as MPEG-4). In an aspect, the encoder 204 can be a device such as a transcoder that conditions streaming data and/or changes it from one format to another. The encoder 204 can be configured to receive the data stream, or other type of signal, from one or more of the data sources 202 and encode/transcode information onto the data stream. In an exemplary embodiment, the encoder 204 can be configured to add information to the data stream relating to content fragments 208 or data blocks. In an aspect, a buffer or storage medium 209 can be in communication with the encoder 204 or integrated therewith. As an example, data received by the encoder 204 can be buffered or stored in the storage medium 209.

In an aspect, the fragmentor 206 can be in signal communication with the encoder 204 to receive the data stream therefrom. As an example, the fragmentor 206 and the encoder 204 are configured as a unitary device. However, the fragmentor 206 and the encoder 204 can be integrated or separate. In an aspect, fragmentor 206 conditions the data stream (or other data signal) for downstream distribution by a computing device 210 through a content distribution network 212 to user devices 214. In an aspect, the computing device 210 can be an origin Hypertext Transfer Protocol (HTTP) computing device. However, other computing devices can be used, such as a rate adaptive streaming server. As an example, the fragmentor 206 can communicate with the computing device 210 using the POST method of the HTTP. As a further example, the computing device 210 can implement the functions described relative to the encoder 204 and/or the fragmentor. However, other protocols, configurations, and communication methods can be used.

In an aspect, the fragmentor 206 can separate or fragment the data stream into each of the content fragments 208 represented by the data stream based upon information encoded in the data stream by the encoder 204. In another aspect, the fragmentor 206 accesses the information encoded/inserted in the data stream by the encoder 204 to define the content fragments 208 based on, among other things, boundaries, grouping, timing, or duration. Once the content fragments 208 are generated, the content fragments 208 can be transmitted to the content distribution network (CDN) 212 for delivery to the user devices 214 for consumption (e.g., playback). As an example, the computing device 210, CDN 212, and the user devices 214 can intercommunicate using the GET method of HTTP. However, other protocols and communication methods can be used.

In an aspect, one or more of the user devices 214 can comprise a storage medium 216 such as a buffer or storage device. As an example, the storage medium 216 can comprise a memory or a storage device. As a further example, a number of the content fragments 208 can be loaded into the storage medium 216 and stored for playback by the associated user device 214. Accordingly, the user device 214 can retrieve the content fragments 208 from the storage medium 216 for playback without having to communicate with the CDN 212, thereby reducing latency and network bandwidth and storage/cache resources required to deliver these content fragments 208 from the CDN 212. The content fragments 208 can comprise audio, video, or other data having a time duration (e.g., every two seconds, four seconds, ten seconds). Other data, content, and/or information can be stored in the storage medium 216 such as advertisements and alternative content, for example.

In an aspect, a storage medium 216' can be separate from the user device 214. For example, the storage medium 216' can be located upstream of the user device 214 and downstream of the CDN 212, such as in a home gateway device. As a further example, the storage medium 216' can store information to be transmitted to any number of user devices 214 or other recipient devices. Accordingly, the user device 214 can retrieve the content fragments 208 from the storage medium 216' for playback without having to communicate with the CDN 212, thereby reducing latency in playback as well as preserving network bandwidth and storage/cache resources. In an aspect, the content fragments 208 can be retrieved from storage medium 216 and storage medium 216' simultaneously or in various sequences.

In an aspect, a time element 218 can be in communication with one or more of the encoder 204, the fragmentor 206, and the computing device 210 to provide a timing reference thereto. As an example, the time element 218 can be a clock. As a further example, the time element 218 can transmit information to one or more of the encoder 204, the fragmentor 206, and the computing device 210 for associating a time stamp with a particular event received by one or more of the encoder 204, the fragmentor 206, and the computing device 210. In an aspect, one or more of the encoder 204, the fragmentor 206, and the computing device 210 can cooperate with the time element 218 to associate a time stamp with events having an effect on the content delivered to the user devices 214, such as, for example, content or data request, content or data download, a channel tune, a remote tune, remote control events, playpoint audits, playback events, program events including a program start time and/or end time and/or a commercial/intermission time, and/or playlist timing events, and the like.

As an example, a storage medium 220 can be in communication with one or more of the user device 214 and the computing device 210 to send/receive data such as content and/or index information such as an index therebetween. As a further example, the storage medium 220 can be located remotely from the user device 214, such as a network storage medium. In an aspect, to manage the data transmitted throughout the system and network 200, such as to one or more of the user devices 214, and/or other devices, an index can be generated as an index of data stored in one or more locations and/or in one or more storage mediums. In another aspect, the index can comprise the locations of various quality level (e.g., bitrate and resolution) content fragments 208 located at network storage or local device storage or combination thereof. As an example, a user device or an associated device can receive the index and can dynamically request particular data to be received. Transmission of any combination of various content fragments 208 having varying quality level and network/local storage location can be facilitated on a fragment-by-fragment basis using the index. For example, if bandwidth is limited, a lower resolution content fragment 208 can be requested. As a further example, the index can comprise location information relating to the storage location of the requested content fragment 208. Accordingly, the content fragment 208 can be requested from an appropriate location. The index can be updated on a fragment-by-fragment basis by a CDN, storage medium, home gateway, or user device, or a combination thereof. As an example, a device can monitor and/or receive information relating to one or more fragments and can update the index to reflect the information (e.g., changes or updates).

In an aspect, the index can provide location information that can be processed by a device to facilitate locating and/or requesting particular data segments from one or more of a plurality of sources. In another aspect, storage medium 220 can be configured to store (e.g., cache) one or more data reads (e.g., index requests) from indexes relating to one or more content items. As an example, when a request for data (e.g., data asset, location information relating to a data asset) is processed by the computing device 210, the storage medium 220 can cache the result of the request. In another aspect, the storage medium 220 can cache one or more indexes, while not caching data reads from the one or more content assets. At a performance asymptote, the storage device 220 can provide a cache of all the relevant indexes for one or more users or user devices in order to minimize the data reads transmitted to the first computing device. As an example, once an in-memory cache is fully populated (e.g., populated over a threshold) with the relevant index data, the computing device 210 can process requests for fragment data (e.g., content fragment 208) and minimize resources used in processing indexes. In a further aspect, the storage medium 220 that is configured to cache one or more data reads relating to indexes can also be configured to maintain the cache of indexes such that the cached indexes are not evicted or deleted unless they are updated. In a further aspect, selective caching can be implemented by toggling-on cache usage for index reads and toggling-off cache usage for the larger and less frequent fragment reads (e.g., content request). As an example, when the underlying implementation is based on a network file system NFS, the toggling-off of caching of fragment reads can be executed by setting the O_DIRECT flag to true in the read system call.

Figures 3, 4:
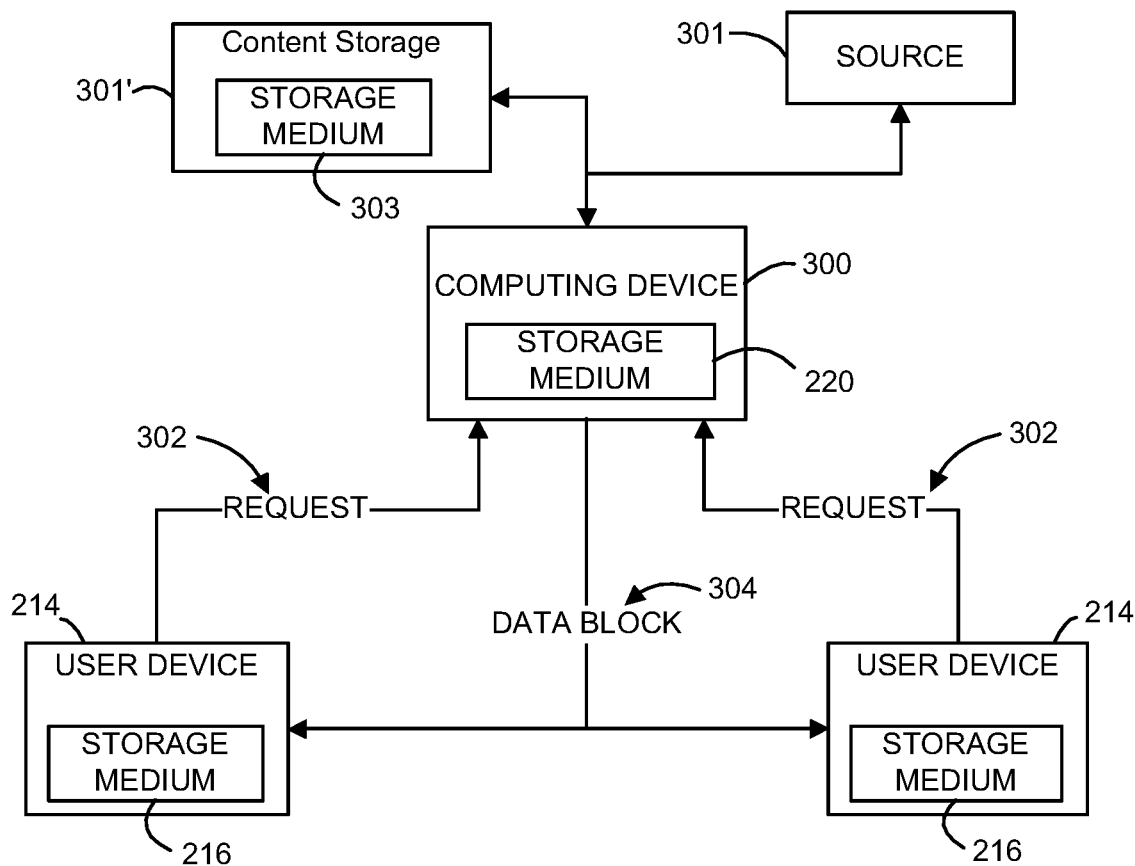
FIG. 3 is a block diagram of an example system architecture.
FIG. 4 is a representation of an example index.

In an aspect, provided are methods and systems for controlling content transmitted to one or more devices. In an aspect, one or more devices can request one or more data blocks from a content source, origin server, streaming server, rate adaptive server, local storage, remote storage, network storage, or the like. FIG. 3 is a block diagram of an example system. In an aspect, a computing device 300 (e.g., origin server, streaming server, etc.) can be in communication with one or more of the user devices 214. In an aspect, the computing device 300 can be in communication with one or more data sources 301 (e.g., content storage 301') and/or content providers. As an example, the computing device 300 can be configured to manage the storage and/or transmission of data, such as data blocks, data segments, and content fragments transmitted to one or more of the user devices 214. Data can be stored in various storage mediums such as storage medium 216 and/or storage medium 220. In another aspect, the computing device 300 can log and/or analyze one or more data or content requests 302 received from one or more of the user devices 214 or other devices. As an example, the data assets can be in various formats such as DASH, HDS, HLS, Smooth, and the like.

In an aspect, the computing device 300 can be configured to generate an index (e.g., manifest). FIG. 4 illustrates an example index. The index can comprise identifiers associated with one or more content assets such as videos, and particular segments, fragments, data blocks, and the like. In an aspect, the index can comprise information relating to the content assets such as location, bitrate, resolution, cost function and the like. In another aspect, the index can comprise information relating to various quality level (e.g., bitrate and resolution) content fragments located at network storage, local device storage, or a combination thereof. When the location of one or more of the content items is changed, the index can be modified to reflect the updated location of the content items. As an example, a device, such as computing device 300, can be configured to monitor locations of one or more data segments or items and can automatically update the index file to reflect an up-to-date location of the data segments. As a further example, information relating to the location of the data segments can be accessed or received by any device, such as a storage device, and transmitted to the computing device 300 for updating the index file.

In an aspect, a device, such as a user device, can receive the index and can dynamically request particular data to be received. Transmission of any combination of various data segments having varying quality level and network/local storage location can be facilitated on a segment by segment basis based on the index. As an example, when conditions such as a network limitations do not allow efficient transmission of high definition video from a first location over a network, the device can request an alternate version of the high definition video from a second location, or a group of locations, based upon the index.

Returning to FIG. 3, computing device 300 can be configured to store (e.g., cache) one or more data reads (e.g., index requests) from indexes relating to one or more content items. In an aspect, a first request (e.g., request 302) for a content asset can be received by the computing device 300. Based on the first request, the computing device 300 can access or receive an index from a data source 301 (e.g., content storage 301') associated with the content asset. In another aspect, the index can be stored in a storage medium (e.g., storage medium 220) that is located downstream from the data source 301 (e.g., content storage 301') relative to the source of the request. In an aspect, a second request (e.g., request 302) for the content asset can be received by the computing device 300. Based on the second request, the computing device 300 can access or receive the index from the storage medium. The accessed index can be processed to locate the requested content asset. The content asset can be accessed based on the index and the content asset can be provided to the source of the second request in response to the second request.

In another aspect, the computing device 300 can cache one or more indexes, while not caching data reads from the actual one or more content assets. As an example, once an in-memory cache is fully populated with the relevant index data, the data source 301 can process requests for fragment data and minimize resources used in processing index requests. In a further aspect, the computing device 300 that is configured to cache one or more data reads relating to indexes can also be configured to maintain the cache of indexes such that the cached indexes are not evicted or deleted unless they are updated. In a further aspect, selective caching can be implemented by toggling-on cache usage for index reads and toggling-off cache usage for the larger and less frequent fragment reads (e.g., content request). As an example, when the underlying implementation is based on a network file system NFS, the toggling-off of caching of fragment reads can be executed by setting the O_DIRECT flag to true in the read system call.

In an aspect, computing device 300 can determine whether particular data such as data blocks 304 (e.g., content block, special content block, advertisement, blackout screen, alternative programming content, etc.) should be transmitted to one or more of the user devices 214. As an example, the data blocks 304 can be transmitted directly to the user device 214 from the content source 301. However, the data blocks 304 can be routed through a network. As a further example, the data blocks 304 can be retrieved directly from a computing device such as the computing device 300. In an aspect, data blocks 304 can be spliced into the content fragments received at the user device 214 based upon an instruction from the computing device 300. As an example, the computing device 300 can be a rate adaptive computing device and can encode the requested data blocks 304 into fragments. Each fragment can be encoded based on one or more profile settings for recipient devices, users, and/or content players. Each fragment can comprise an encoding rate and fragment duration. In an aspect, two or more data blocks and/or fragments can relate to the same content asset. As an example, multiple versions (e.g., having different characteristics, such as bit rate, format, resolution, cost function, etc.) of the same content asset can be generated. As a further example, the versions of the content asset can be stored in various portion of a network or system. In an aspect, a index can be generated to represent a clearinghouse of information relating to the versions of the content asset stored in various locations.

Figure 5:
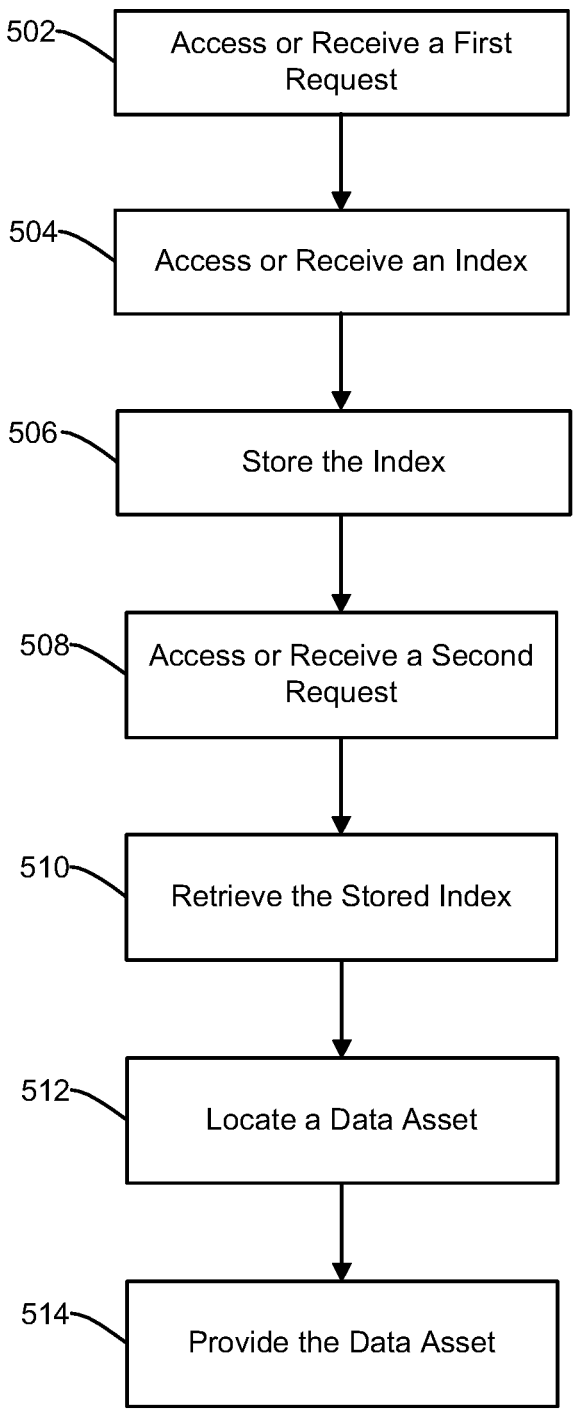
FIG. 5 is a flow chart of an example method.

FIG. 5 illustrates an example method. In step 502, a first request (e.g., data request, request for content, fragment request) can be accessed or received. In an aspect, the first request can be received from a first computing device (e.g., user device, device configured to present content) via a network.

In step 504, an index can be accessed (e.g., retrieved) or received in response to the first request. The index can be accessed from a first storage medium. In an aspect, the first storage medium can be associated with storage for one or more content assets. In another aspect, the index can comprise location information relating to a content fragment. In a further aspect, the index can comprise information relating to a bit rate, a resolution, or a combination thereof.

In step 506, the index can be stored in a second storage medium. In an aspect, the first storage medium can be located in the network upstream (e.g., physically or logically) from the second storage medium relative to the first computing device. In another aspect, storing the index in a second storage medium can comprise dynamically managing the available storage space of the second storage medium. As an example, capacity of the second storage medium can be monitored and additional capacity can be provided via one or more other storage mediums. As a another example, indexes relating to requests from a plurality of user devices can be stored in available storage space of the second storage medium such that the second storage medium operates as a clearing house of the stored indexes for the plurality of user devices. As a further example, one or more indexes can be stored in the second storage medium based upon a frequency of requests for the one or more index and/or a data block associated with the one or more index or content item. As such, popular indexes can be maintained at the second storage medium, while other indexes can be automatically discarded, for example, if storage space is limited.

In step 508, a second request (e.g., data request, request for content, fragment request) can be accessed or received. In an aspect, the second request can be received from one or more of the first computing device (e.g., user device, device configured to present content) and a second computing device, via a network. As an example, requests from a plurality of devices can be received and processed in a centralized manner. As a further example, when an index is cached in the second storage medium, one of more devices of the plurality of devices can access the second storage medium to retrieve the index, rather than having to retrieve the index from the first storage medium. As such, the second storage medium and serve as index storage for the plurality of devices.

In step 510, the index can be accessed (e.g., retrieved) from the second storage medium in response to the second request. In an aspect, the index can be provided to the one or more of the first computing device and the second computing device to satisfy the second request.

In step 512, a data asset can be located, for example, using the accessed index. In an aspect, the index can comprise location information associated with one or more data assets. In step 514, the located data asset can be provided to the one or more of the first computing device and the second computing device to satisfy the second request. Transmission of any combination of various data blocks, such as content items having varying quality level and network/local storage location, can be facilitated on a segment by segment basis based on the index. As an example, when conditions such as a network limitations do not allow efficient transmission of high definition video from a first location over a network, the device can request an alternate version of the high definition video from a second location, or a group of locations, based upon the index.

Figure 6:
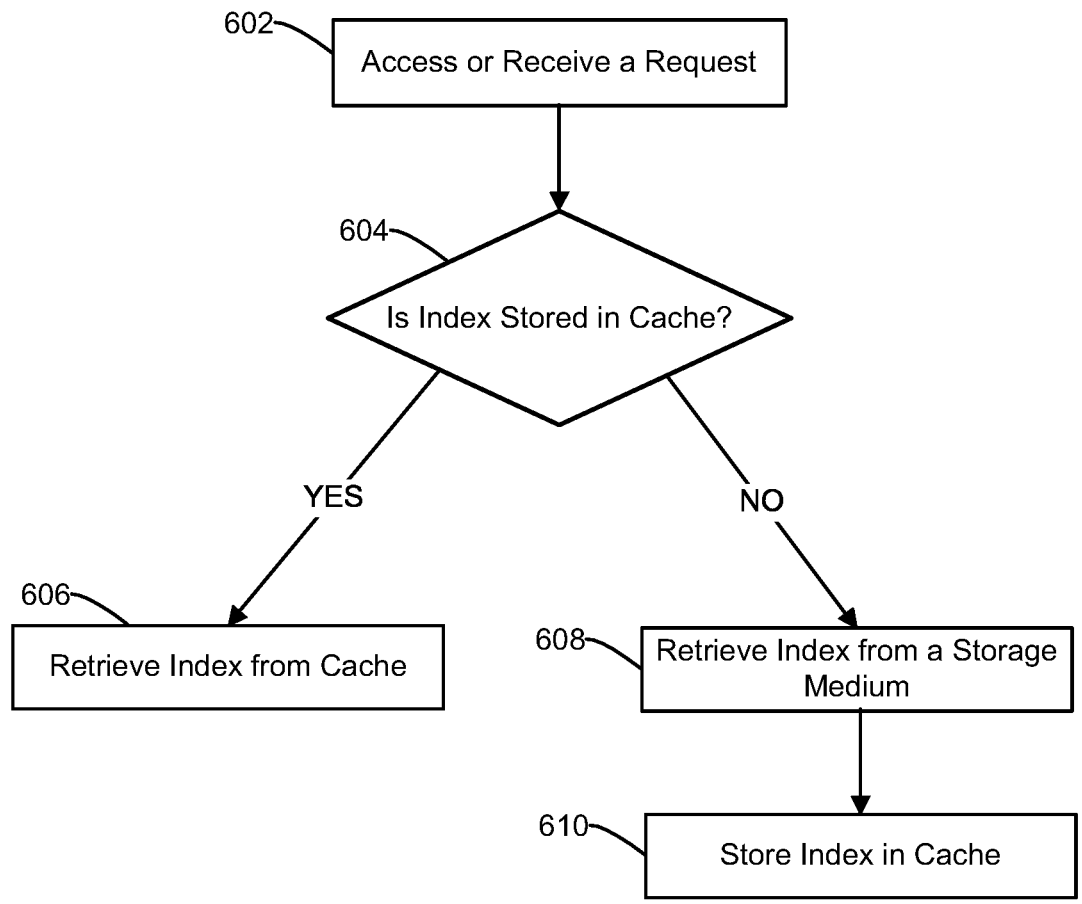
FIG. 6 is a flow chart of an example method.

FIG. 6 illustrates an exemplary method. In step 602, a request (e.g., data request, request for content, fragment request) can be accessed or received. In an aspect, the request can be received from a computing device (e.g., user device, device configured to present content) via a network.

In step 604, a determination can be made whether an index associated with the requested data asset is stored in a cache (e.g., storage medium). In an aspect, the index can comprise information for retrieving a fragment, such as location information relating to a content fragment. In another aspect, the index can further comprise information relating to a bit rate, a resolution, or a combination thereof.

In step 606, if the index is stored in the cache, the index can be accessed from the cache. In step 608, if the index is not stored in the cache, the index can be accessed (e.g., retrieved) from the first storage device. The accessed index and then be stored in the cache, at step 610. In an aspect, the cache can be separate from the first storage device. In another aspect, the cache can be disposed remotely from the first storage device. In a further aspect, the cache can be disposed downstream from the first storage device relative to a source of the request. Such downstream location can provide a lower latency for servicing the request, as compared to servicing the request through the first storage device.

Figure 7:
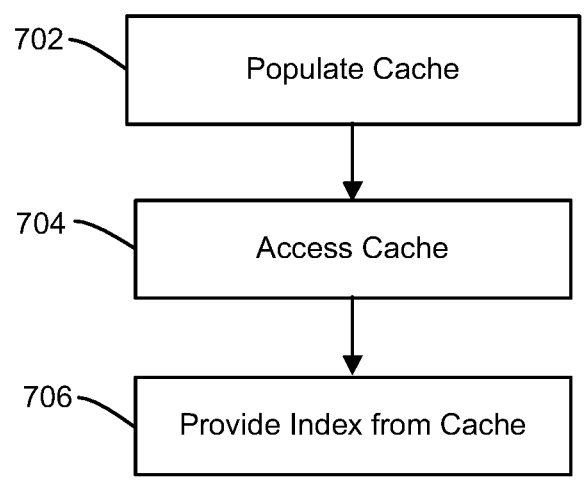
FIG. 7 is a flow chart of an example method.

FIG. 7 illustrates an exemplary method. In step 702, a cache can be populated with one or more indexes. One or more of the indexes can comprise location information relating to a content fragment. One or more of the indexes can comprise information relating to a bit rate, a resolution, or a combination thereof. In an aspect, the cache can be populated from a remote storage device located upstream of the cache. In another aspect, the cache can be populated by caching data reads directed to the remote storage device. The remote storage device can have content fragments stored thereon.

In step 704, the cache can be accessed (e.g., read) for a requested index. In step 706, the requested index can be provided to a requesting device. In an aspect, the requested index can facilitate the request of a data fragment stored remotely from the cache. Transmission of any combination of various data blocks such as content items having varying quality level and network/local storage location can be facilitated on a segment by segment basis based on the index. As an example, when conditions such as a network limitations do not allow efficient transmission of high definition video from a first location over a network, the device can request an alternate version of the high definition video from a second location, or a group of locations, based upon the index.

Figure 8:
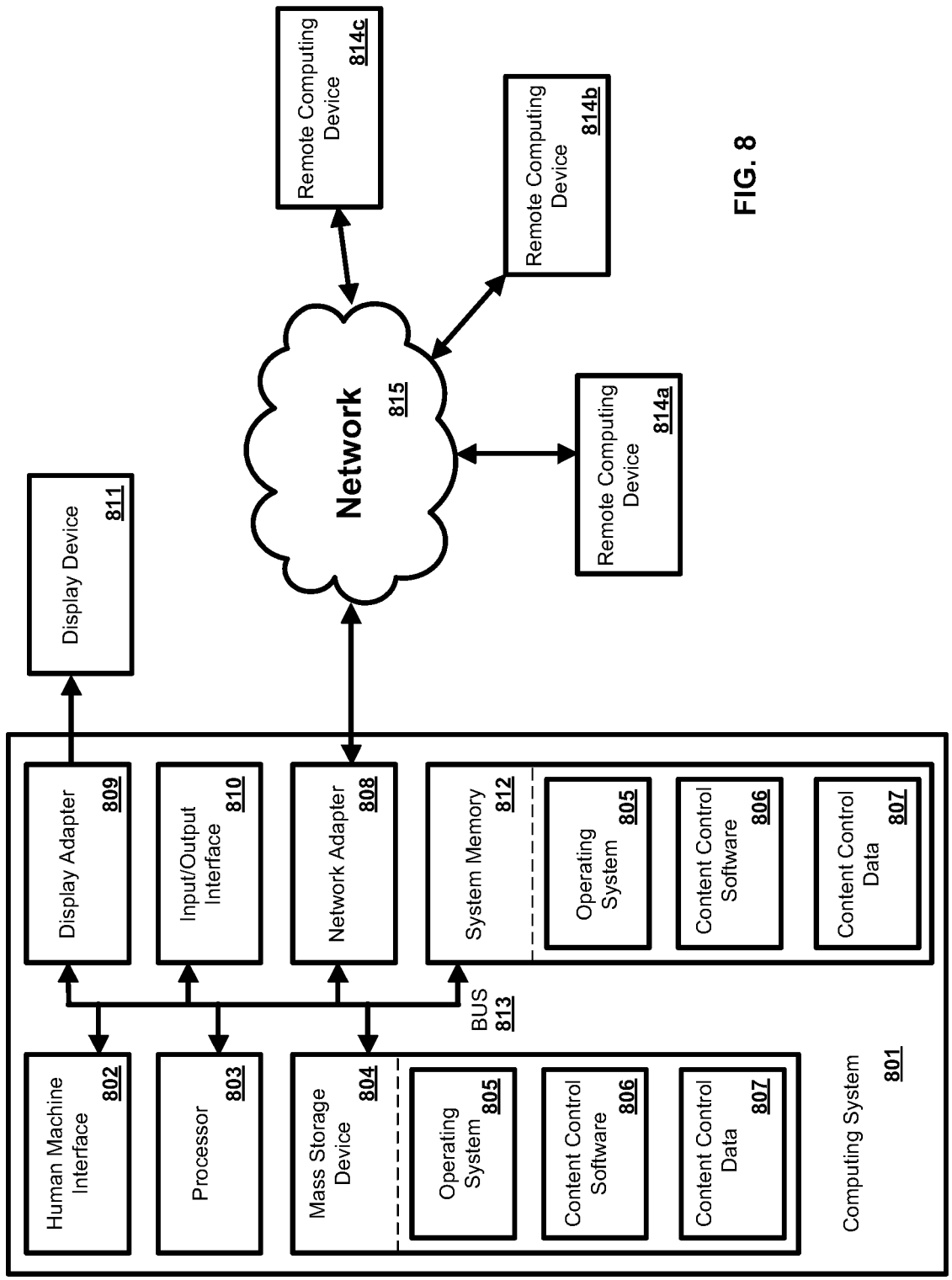
FIG. 8 is a block diagram of an example computing system.

In an exemplary aspect, the methods and systems can be implemented on a computing system 801 as illustrated in FIG. 8 and described below. By way of example, computing device 210, the user device 214, and/or the computing device 300 can be a computing system as illustrated in FIG. 8.

FIG. 8 is a block diagram illustrating an exemplary operating environment for performing the disclosed methods. One skilled in the art will appreciate that provided herein is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 801. The components of the computing system 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, content control software 806, content control data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computing system 801 typically comprises a variety of computer readable media. Exemplary readable media can be any available media that is accessible by the computing system 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as content control data 807 and/or program modules such as operating system 805 and content control software 806 that are immediately accessible to and/or are presently operated on by the processing unit 803.

In another aspect, the computing system 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computing system 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and content control software 806. Each of the operating system 805 and content control software 806 (or some combination thereof) can comprise elements of the programming and the content control software 806. Content control data 807 can also be stored on the mass storage device 804. Content control data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 807 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing system 801 can have more than one display adapter 809 and the computing system 801 can have more than one display device 811. For example, a display device can be a monitor, an LCD (Liquid Crystal Display), or a projector. In addition to the display device 811, other output peripheral devices can comprise components such as speakers (not shown) and a printer (not shown) that can be connected to the computing system 801 via Input/Output Interface 810. Any step and/or result of the methods can be output in any form to an output device. Such output can be any form of visual representation, including, but not limited to, textual, graphical, animation, audio, tactile, and the like. The display 811 and computing system 801 can be part of one device, or separate devices.

The computing system 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computing system 801 and a remote computing device 814a,b,c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing system 801, and are executed by the data processor(s) of the computer. An implementation of content control software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
 receiving a request for a first version of content;
 determining an index defining a location of the first version of the content and a location of a second version of the content;
 storing the index in a cache;
 determining that a quantity of data stored in the cache satisfies a threshold, the data comprising the index; and
 processing, based on the quantity of the data stored in the cache satisfying the threshold, a request for the second version of the content according to the index from the cache.

2. The method of claim 1, wherein the index comprises a first index file and a second index file.

3. The method of claim 1, further comprising:
 determining that bandwidth is limited, wherein the processing the request for the second version of the content is based on the determining that bandwidth is limited.

4. The method of claim 1, wherein the first version is associated with a first bitrate and the second version is associated with a second bitrate different from the first bitrate.

5. The method of claim 1, further comprising:
 determining a change in a characteristic of the content;
 updating the index to reflect the change in the characteristic; and
 replacing the stored index with the updated index in the cache.

6. The method of claim 5, further comprising maintaining the index unless the index is updated.

7. The method of claim 5, wherein the characteristic comprises one or more of a location of the content, a content identifier, or a cost function.

8. The method of claim 1, wherein the storing the index in the cache comprises managing available storage space of the cache.

9. An apparatus comprising:
 one or more processors; and
 a memory storing processor-executable instructions that, when executed by the one or more processors, cause the apparatus to:
 receive a request for a first version of content;
 determine an index defining a location of the first version of the content and a location of a second version of the content;
 store the index in a cache;
 determine that a quantity of data stored in the cache satisfies a threshold, the data comprising the index; and
 process, based on the quantity of the data stored in the cache satisfying the threshold, a request for the second version of the content according to the index from the cache.

10. The apparatus of claim 9, wherein the index comprises a first index file and a second index file.

11. The apparatus of claim 9, wherein the processor-executable instructions further cause the apparatus to:
 determine that bandwidth is limited, wherein the processing the request for the second version of the content is based on the determining that bandwidth is limited.

12. The apparatus of claim 9, wherein the first version is associated with a first bitrate and the second version is associated with a second bitrate different from the first bitrate.

13. The apparatus of claim 9, wherein the processor-executable instructions further cause the apparatus to:
 determine a change in a characteristic of the content;
 update the index to reflect the change in the characteristic; and
 replace the stored index with the updated index in the cache.

14. The apparatus of claim 13, wherein the processor-executable instructions further cause the apparatus to: maintain the index unless the index is updated.

15. The apparatus of claim 13, wherein the characteristic comprises one or more of a location of the content, a content identifier, or a cost function.

16. The apparatus of claim 9, wherein the storing the index in the cache comprises managing available storage space of the cache.

17. One or more non-transitory computer-readable media storing processor-executable instructions that, when executed by at least one processor, cause the at least one processor to:
 receive a request for a first version of content;
 determine an index defining a location of the first version of the content and a location of a second version of the content;
 store the index in a cache;
 determine that a quantity of data stored in the cache satisfies a threshold, the data comprising the index; and
 process, based on the quantity of the data stored in the cache satisfying the threshold, a request for the second version of the content according to the index from the cache.

18. The one or more non-transitory computer-readable media of claim 17, wherein the index comprises a first index file and a second index file.

19. The one or more non-transitory computer-readable media of claim 17, wherein the processor-executable instructions further cause the at least one processor to:
 determine that bandwidth is limited, wherein the processing the request for the second version of the content is based on the determining that bandwidth is limited.

20. The one or more non-transitory computer-readable media of claim 19, wherein the storing the index in the cache comprises managing available storage space of the cache.

21. The one or more non-transitory computer-readable media of claim 17, wherein the first version is associated with a first bitrate and the second version is associated with a second bitrate different from the first bitrate.

22. The one or more non-transitory computer-readable media of claim 17, wherein the processor-executable instructions further cause the at least one processor to:
 determine a change in a characteristic of the content;

update the index to reflect the change in the characteristic; and replace the stored index with the updated index in the cache.

23. The one or more non-transitory computer-readable media of claim 22, wherein the processor-executable instructions further cause the at least one processor to: maintain the index unless the index is updated.

24. The one or more non-transitory computer-readable media of claim 22, wherein the characteristic comprises one or more of a location of the content, a content identifier, or a cost function.

\* \* \* \* \*